(No Model.) 10 Sheets—Sheet 1.

C. GÜTTINGER.
EMBROIDERING MACHINE.

No. 350,053. Patented Sept. 28, 1886.

WITNESSES:
David Williams
John M. Clayton

INVENTOR:
Carl Güttinger
by his Attorneys
Howson & Sons (No Model.) 10 Sheets—Sheet 3.

C. GÜTTINGER.
EMBROIDERING MACHINE.

No. 350,053. Patented Sept. 28, 1886.

WITNESSES:
David Williams
John M. Clayton

INVENTOR:
Carl Güttinger
by his Attorneys
Howson & Sons (No Model.) 10 Sheets—Sheet 4.

C. GÜTTINGER.
EMBROIDERING MACHINE.

No. 350,053. Patented Sept. 28, 1886.

WITNESSES:
David Williams
John M. Clayton.

INVENTOR:
Carl Güttinger
by his attorneys
Howson & Sons (No Model.)  10 Sheets—Sheet 5.

C. GÜTTINGER.
EMBROIDERING MACHINE.

No. 350,053.  Patented Sept. 28, 1886.

WITNESSES:
David Williams
John M. Clayton

INVENTOR:
Carl Güttinger
by his Attorneys
Howson & Sons (No Model.) 10 Sheets—Sheet 10.
C. GÜTTINGER.
EMBROIDERING MACHINE.

No. 350,053. Patented Sept. 28, 1886.

FIG. 31.

WITNESSES:
David Williams
John M. Clayton

INVENTOR:
Carl Güttinger
by his Attorneys.
Howson & Sons

UNITED STATES PATENT OFFICE.

CARL GÜTTINGER, OF CAMDEN, N. J., ASSIGNOR TO JACOB LOEB, OF CHELTENHAM TOWNSHIP, PA., MAX SCHOENFELD, OF RORSCHACH, SWITZERLAND, AND DAVID SCHOENFELD, OF PHILADELPHIA, PA.

EMBROIDERING-MACHINE.

SPECIFICATION forming part of Letters Patent No. 350,053, dated September 28, 1886.

Application filed January 7, 1884. Serial No. 116,678. (No model.)

*To all whom it may concern:*

Be it known that I, CARL GÜTTINGER, a citizen of the Republic of Switzerland, and a resident of Camden, New Jersey, United States of America, have invented certain Improvements in Embroidering Machines, of which the following is a specification.

My invention relates to improvements in that class of embroidering-machines in which a suspended frame carrying the stretched fabric to be embroidered is so combined with a series of embroidering devices and pantograph mechanism and is so traversed that a series of figures exactly like each other and like a given pattern will be embroidered simultaneously on the said fabric.

My improvements, which are fully described hereinafter, are directed, mainly, to the embroidering mechanism, to pantograph mechanism, to a device for simultaneously cutting all the threads when such a proceeding is required, and to mechanism for notifying the attendant when one or more of the threads break.

In order that my improvements may be fully understood, I have deemed it necessary to illustrate and explain the machine in full, including many features which are to be found in other machines, such as that described in Patent No. 262,383, granted to J. Ebneter, August 8, 1882, and the Patent No. 271,182, granted to the assignees of C. N. Wurth, January 3, 1883.

In order to avoid repeated interruptions in the description, I have not, in proceeding with the latter, distinguished what is old from what I consider to be new, as the features which constitute my improvements are fully set forth in the claims, by which this distinction can be readily made.

In the accompanying drawings, Figure 1, Sheet 1, is a front view of an embroidering-machine embodying my improvements without illustrating the detailed construction of the parts.

To prevent confusion, the description has been separated into sections under the following heads, namely: First, a general description of the frame-work of the machine; second, the embroidering devices; third, gearing for driving the needle and looping mechanism; fourth, the pantograph mechanism; fifth, co-operation of the pantograph mechanism with the embroidering mechanism; sixth, the cutting-off mechanism; seventh, mechanism for retaining the threads while they are being cut; eighth, signaling to indicate the breaking of one or more threads; ninth, mechanism for starting and stopping the machine.

Figure 1:
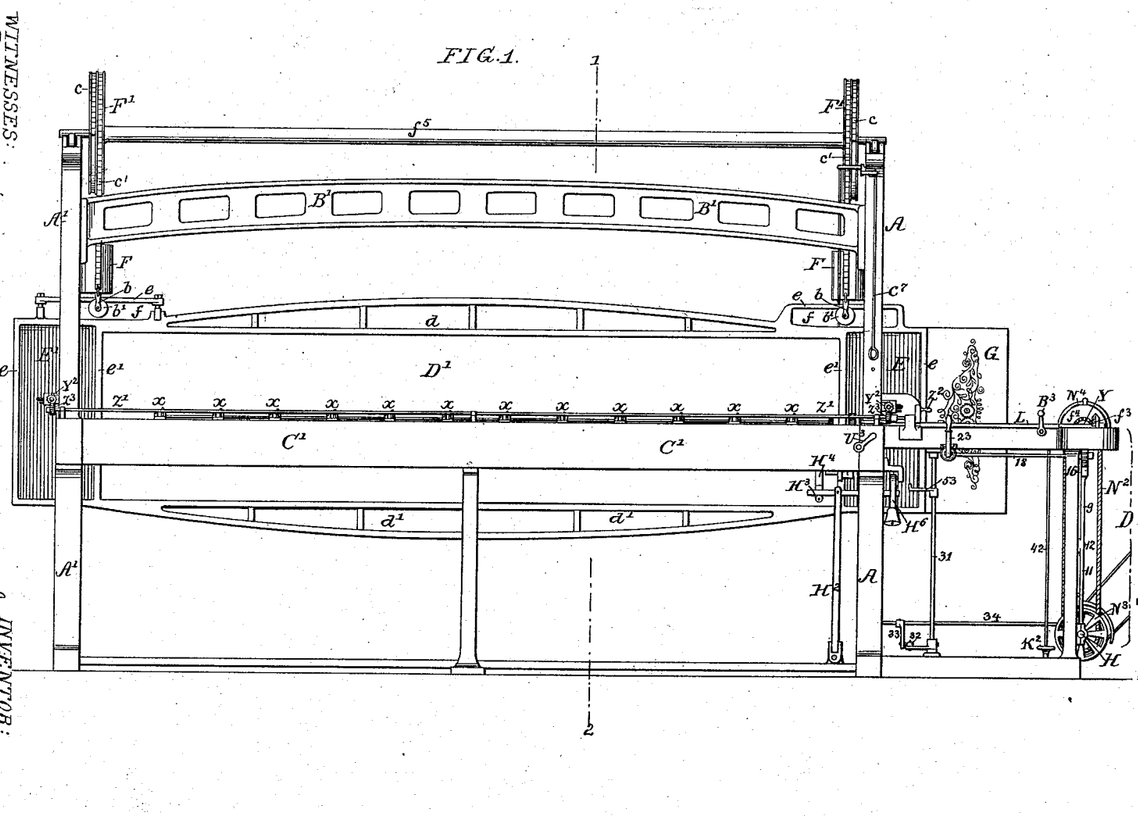
Figure 2:
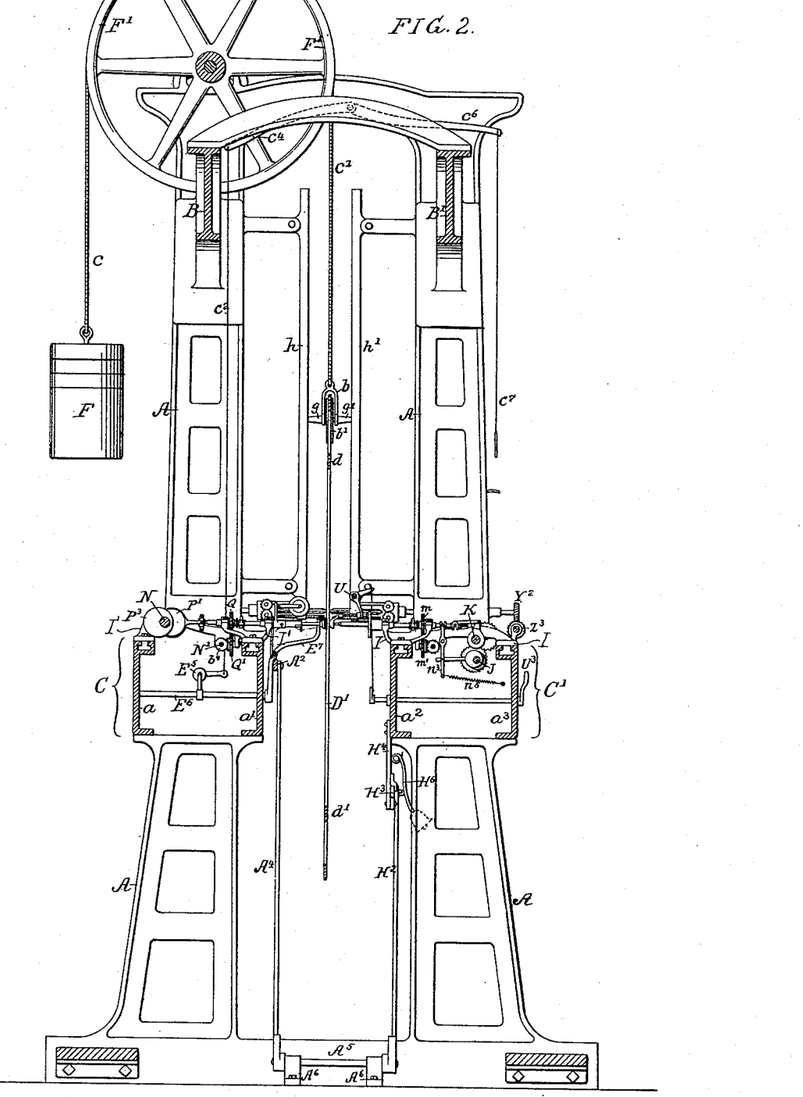
Fig. 2, Sheet 2, a vertical section on the line 1 2, Fig. 1.

*The frame-work of the machine and the embroidering-frame shown in Figs. 1 and 2.*—There are two vertical standards, A A', which are connected together near the top by two longitudinal beams, B B', and at a suitable distance above the base by the longitudinal beams $a$, $a'$, $a^2$, and $a^3$, the beams $a$ $a'$ forming one bed, C, and the other beams, $a^2$ and $a^3$, the other bed, C', of the machine. An extension, D, Fig. 1, of the frame-work will be referred to hereinafter. It should be understood that in carrying out my invention it is not essential to adhere to this frame-work, which I, however, prefer, as it is well adapted to the purpose, and is as light as it can be made consistent with proper stability. The frame D', Fig. 1, upon which the fabric to be embroidered is stretched, and which is therefore termed the "embroidering-frame," consists of two longitudinal trussed bars, $d$ $d'$, connected together at each end by the vertical bars $e$ $e'$, the whole being preferably cast in one piece. The oblong space bounded by the bars $d$ $d'$ and $e$ $e'$ is open, and across this space is stretched the fabric to be embroidered; but at one end of the frame is secured the pantograph-plate E, and at the opposite end of the frame the pantograph-plate E', these plates being specially referred to hereinafter in another branch of the specification. The embroidering-frame is counterbalanced by weights F F—one near each end of the frame-work of the machine—the chain $c$, to which each weight is suspended, being secured to and partially surrounding a pulley, F', in one groove of the same, and another chain, attached to the same pulley and partially surrounding the same, being attached to a pulley-carrier, $b$, on the pulley $b'$, in which is a groove adapted to a bar, $e$, of the embroidering-frame, in which is an elongated opening, $f$, this arrangement being the same at both ends of the frame. The two pulleys F' F' are secured to a shaft, $f^5$, one near each end of the said shaft, which has its bearings in the end standards, A A', of the frame-work of the machine. Each of the pulley-carriers $b$ is guided laterally by the vertical bars $h$ $h'$, which are secured to the frame-work of the machine, projections $g$ $g'$ of the carrier bearing lightly one against one bar and the other against the opposite bar, as shown in Fig. 2, the guiding-bars being omitted in Fig. 1 to prevent confusion. It will be seen that the embroidering-frame thus balanced and suspended can be traversed in all directions, longitudinally, vertically, and diagonally, but always in the same plane. Before leaving this part of the description I may refer to the positions indicated by the letter $x$ in Fig. 1 of the several embroidering-machines—twelve in the present instance. I may also point to the position of the pattern-board G on one end of the embroidering-frame, and to that of the driving-shaft H, which has its bearings on the extension D of the framework.

*The embroidering devices.*—These are illustrated in detail on Sheets 3 and 4, each embroidering device, and they are all alike, consisting of two main parts—namely, the needle mechanism shown on Sheet 3, and the looping mechanism illustrated on Sheet 4—the twelve looping mechanisms being on the bed C of the fixed frame on one side of the embroidering-frame, and the twelve needle mechanisms on the bed C' on the opposite side of the said embroidering-frame, as shown in Fig. 2.

Figures 3, 4, 5, 6:
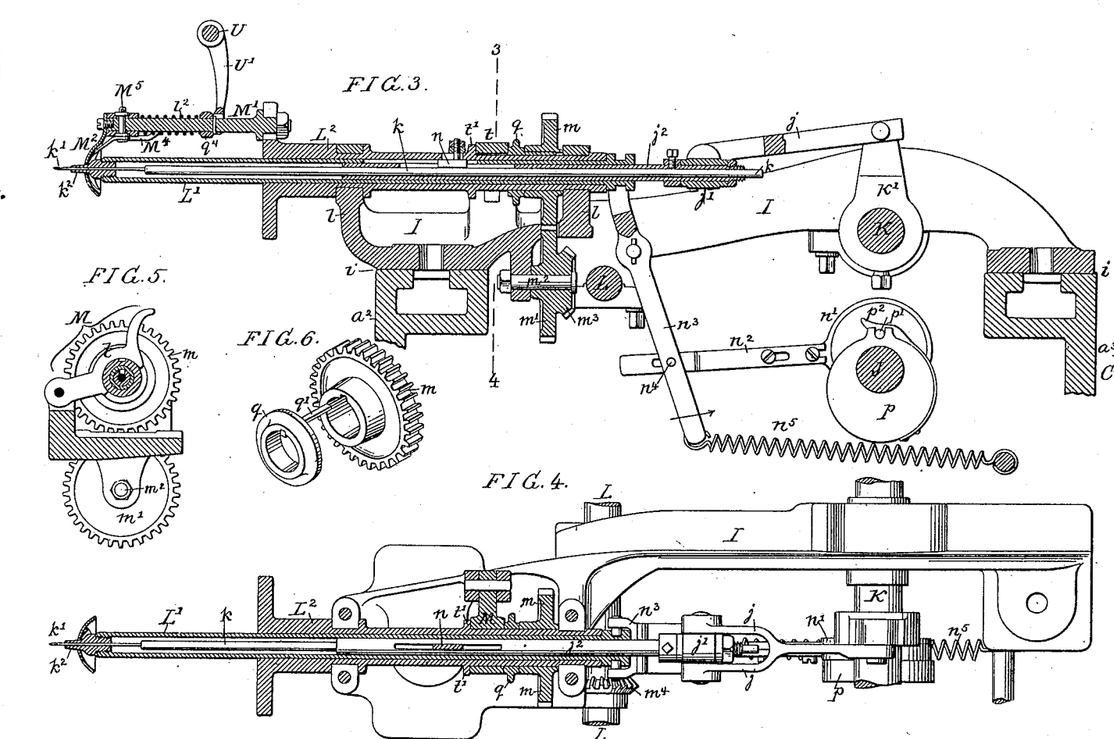
Fig. 3, Sheet 3, a vertical section of the needle mechanism of the embroidering devices.
Fig. 4, a sectional plan of Fig. 3.
Fig. 5, a transverse section on the line 3 4, Fig. 3.
Fig. 6, a detached perspective view of part of the needle mechanism.
Figures 7, 8, 9, 10, 11:
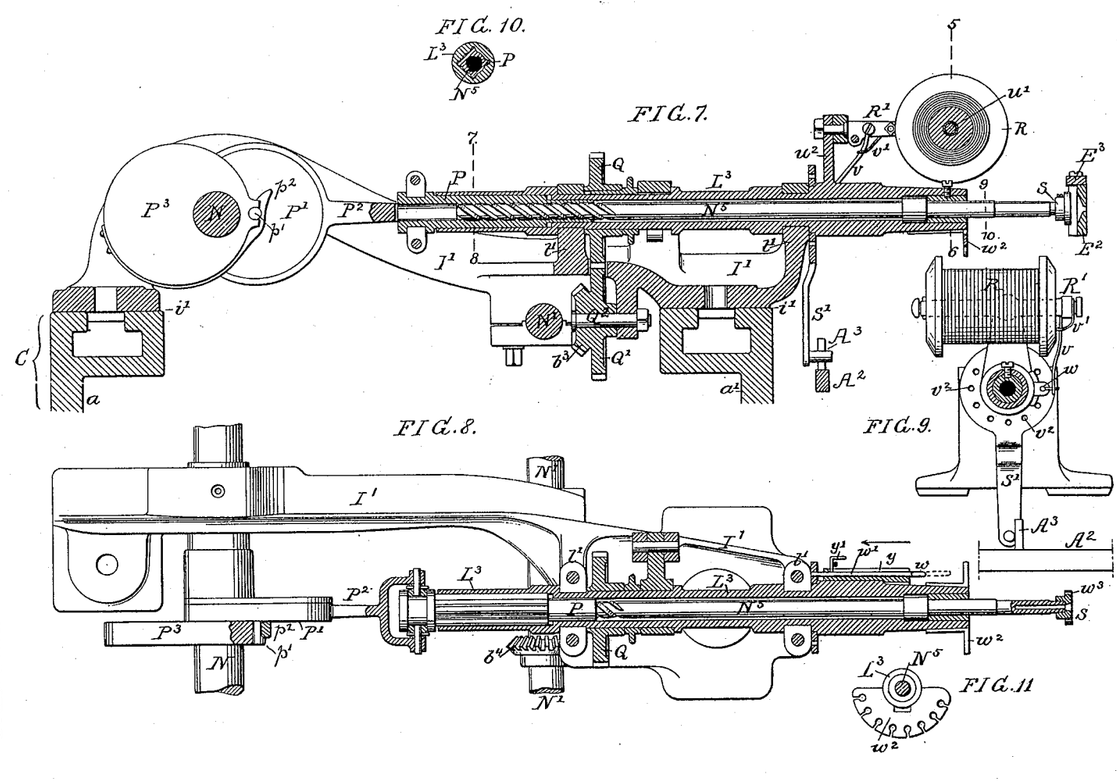
Fig. 7, Sheet 4, a vertical section of the looping mechanism.
Fig. 8, a sectional plan of the same.
Fig. 9, a transverse section on the line 5 6, Fig. 7, showing the spool in elevation.
Fig. 10, a transverse section on the line 7 8, Fig. 7.
Fig. 11, a transverse section on the line 9 10, Fig. 7.

Referring, in the first instance, to the needle mechanism, I is a small frame secured to the above-mentioned bed C' of the frame-work at $i$ and $i$, Fig. 3, and J, K, and L are three longitudinal shafts common to all the needle mechanisms, the shaft J being rotated when the machine is in operation, the rock-shaft K being vibrated while the shaft L is under the control of the attendant. An arm, K', on the rock-shaft K is connected by a rod, $j$, to a sleeve, $j'$, which is so connected to the tubular rod $j^2$ that while the latter can turn in the sleeve it must be reciprocated therewith, the needle-bar $k$ being contained within the tubular rod and terminating in the needle $k'$, which is guided by a nipple, $k^2$, at the outer end of the tube L', which is arranged to reciprocate in the tubular shaft $L^2$, the latter having its bearings $l$ $l$ on the small frame I. A cog-wheel, $m$, on the tubular shaft $L^2$ gears into a similar wheel, $m'$, on a stud, $m^2$, secured to the small frame I, and on the said wheel $m'$ is a bevel-wheel, $m^3$, gearing into a similar wheel, $m^4$, Fig. 4, on the shaft L. A small block or key, $n$, is adapted to elongated slots in the tube L', and the tubular rod $j^2$ has a threaded stem passing through a slot in the tubular shaft $L^2$, so that all these parts must turn together, while the tube L' and tubular rod $j^2$ can be reciprocated independently of each other and of the tubular shaft $L^2$, the needle-bar being carried by and reciprocating with the said tubular rod $j^2$. A reciprocating movement is imparted to the tube L' by an eccentric, $n'$, on the shaft J, through the medium of the eccentric-rod $n^2$ and lever $n^3$, pivoted to the frame I, the upper forked arm of this lever having pins projecting into an annular groove at the rear end of the tube L'. A pin, $n^4$, passes through an elongated slot in the eccentric-rod $n^2$, and the lower end of the lever $n^3$ is connected to the frame of the machine by a spring, $n^5$, which tends to force the long arm of the lever in the direction of its arrow. Owing to the pin $n^4$ passing through an elongated slot in the eccentric-rod $n^2$, the vibration of the lever $n^3$, and consequently the reciprocation of the tube L', is intermittent, for a purpose explained hereinafter. The eccentric $n'$ is loose on the shaft J; but a pin, $p'$, is adapted to an opening in said eccentric and to a recess in the counterbalancing eccentric $p$, so that so long as the pin is in place the two eccentrics are locked together and rotate with the shaft J. Accidental displacement of the locking-pin $p'$ is prevented by a spring, $p^2$, which is adapted to a notch in the pin, as shown in Fig. 8; but when it is desired to stop the reciprocation of the tube $L'$ the spring can be raised and the pin withdrawn, thus freeing the eccentric $n$ from the control of the fixed eccentric $p$. There is a ring, $q$, loose on the tubular shaft $L^2$, and secured to this ring is a key, $q'$, arranged to fit both in a groove in the shaft and in a groove in the hub of the wheel $m$. When the ring and key have been moved away from the wheel, as shown in Fig. 6, there can be no vibration of the said tubular shaft; but when the ring has been adjusted against the hub of the wheel, the key being in the groove of both shaft and wheel, the former must vibrate. In order to keep the ring in contact with the hub of the wheel I interpose a segment, $t$, between a collar, $t'$, on the tubular shaft and the ring $q$, the segment forming part of an arm, M, Fig. 5, which is pivoted to the frame of the machine, and which can be thrown back when it becomes necessary to throw the shaft out of gear with the wheel.

The movements of the above-described parts may be briefly summarized as follows: First, the uniform reciprocating movement of the needle, by which the hooked end of the latter is caused to pass through the fabric on the embroidering-frame, at the rear of which it cooperates with the looper, described hereinafter, to seize the thread and draw a loop back through the fabric; second, an intermittent reciprocating movement of the tube $L'$ and its nipple $k^2$, through which the needle passes, the nipple, owing to this intermittent movement, being in contact with the fabric as the needle enters the same and as it is withdrawn therefrom, there being an interval, during which the nipple is clear of the fabric while the latter is being traversed by the frame. These two movements are derived from the driving-shaft of the machine; third, the turning of the needle by operating the shaft L, which is under the control of the attendant, and which acts in unison with the pantograph appliances in a manner and for a purpose explained hereinafter.

In connection with the tubular shaft $L^2$ is a thread-cutting device, part of which consists of the rod $M'$, but which will form the subject of a special description.

Turning now to Sheet 4, which illustrates the looping mechanism of the embroidering devices, it will be seen that a small frame, $I'$, is secured at $i'$ $i'$ to the bed C of the machine, the said bed being composed of the longitudinal beams $a$ $a'$. (Shown in Fig. 2.) Two shafts, N N', common to all the looping devices of the machine, have bearings in the small frame $I'$, and to bearings $l'$ $l'$ in the said frame $l'$ is adapted a tubular shaft, $L^3$, and within this shaft is the looper-spindle $N^5$, in which is cut a screw-thread, preferably a double thread, adapted to a like internal thread in a sleeve, P, which fits snugly and is arranged to slide freely in the tubular shaft $L^3$, which is connected to the eccentric-rod $P^2$, the strap of the latter embracing the eccentric P', loose on the shaft N, and the connection being made in the manner shown in Fig. 8, where it will be observed that pins on the forked end of the eccentric-rod project into a two-part ring confined between collars on the tubular shaft.

Secured to the shaft N is a counterbalance-eccentric, $P^3$, and the connection between the same and the eccentric P' is similar to that before described in connection with the eccentrics $n$ and $p$ of the needle mechanism. A cog-wheel, Q, on this shaft gears into a similar wheel, Q', on a stud, $Q^2$, secured to the small frame $I'$, and on the latter is a bevel-wheel, $b^3$, gearing into a like wheel, $b^4$, on the shaft $N'$.

There is a device precisely like that shown in Figs. 5 and 6, by which the wheel Q may be thrown into or out of gear with the tubular shaft $L^3$.

A spool, R, of thread is carried by a spindle, $u'$, on a yoke, R', secured to a projection, $w^2$, on the tubular shaft, the thread from the spool passing first through an eye, $w$, referred to hereinafter, and thence through any one of a number of eyes on a plate, $w^2$, attached to the end of the tubular shaft $L^3$, and thence through an eye, $w^3$, in the looper S, which is attached to the end of the looper-spindle $N^5$. The eye $w$, above referred to, is on the outer end of a small rod, $w'$, which can slide in a projection, $y$, on the tubular shaft $L^3$. A light arm, $v$, is pivoted to the yoke R', and is caused, by a light spring, $v'$, also secured to the yoke, to bear against a projecting pin, $y'$, on the sliding rod $w'$, so that the latter always has a tendency to move in the direction of the arrow, and to enter the nearest of a number of orifices, $v^2$, in the upper portion of an arm, S', which is hung loosely to the tubular shaft $L^3$; but this tendency is counteracted by the thread passing under more or less tension in the direction pointed out. It should be stated here that the shaft N' is under the control of the attendant, and operates in unison with the pantograph mechanism explained hereinafter. If a thread breaks during the movement of the tubular shaft in its bearings, the sliding rod $w'$ will be released, and the spring $v'$, acting on the rod through the medium of the arm $v$, will force the said rod in the direction of the arrow, and will enter one of the orifices of the arm S' and move the same, causing it to strike any signaling device, which may notify the attendant of the accident and prompt him to arrest the machine. This signaling device, depending for its action on the breaking of a thread, has been explained here, owing to its intimate relation to the looping mechanism, but it will be referred to hereinafter in another branch of the specification in connection with signaling devices. The sleeve P is in section of the form shown in Fig. 10, or it may be of any other shape which will prevent it from turning independently of the tubular shaft $L^3$, while it is at liberty to be reciprocated therein, in order to impart the desired vibrating motion to to the looper-spindle and looper.

*Gearing for driving the needle and looping mechanism.*—Before leaving the looping and needle mechanism it will be well to refer briefly to the gearing through which the shafts of these mechanisms are driven. This can be best explained by reference to the plan view, Fig. 12, Sheet 5, in connection with the vertical section, Sheet 2.

Figures 12, 13, 14:
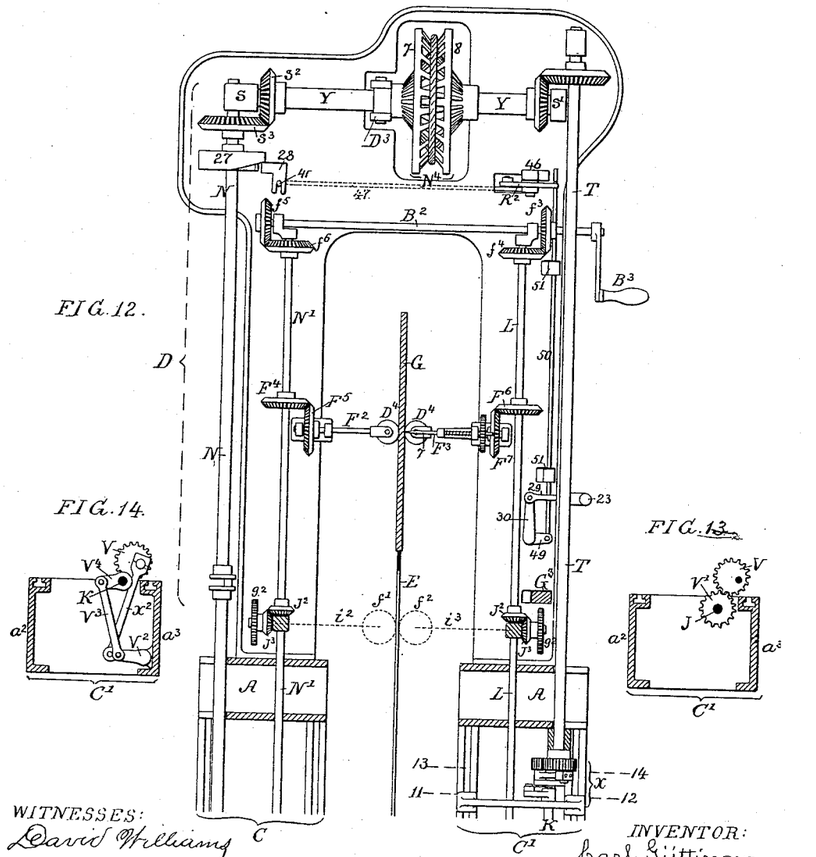
Fig. 12, Sheet 5, a general plan view, drawn to a reduced scale, of part of the machine.
Fig. 13, a vertical section on the line 13 14, Fig. 12.
Fig. 14, a vertical section on the line 11 12, Fig. 12.

In Fig. 12, D is the extension of the frame referred to in connection with Fig. 1, C being the bed to which the series of looping devices above described are secured, and C' the bed which carries the series of needle mechanisms. The extension D of the frame carries the bearings $s\ s'$, Fig. 12, for the counter-shaft Y, which is driven from the main shaft of the machine in a manner explained in a separate branch of the description. This shaft is geared by bevel-wheels $s^2$ and $s^3$ to the longitudinal shaft N, which, as before remarked, is common to all the looper mechanisms, this being the shaft by which every looper-spindle is reciprocated, through the medium of devices illustrated on Sheet 4, and fully described above. The counter-shaft Y is geared to a longitudinal shaft, T, which is discontinued at $x'$, Fig. 12, for the introduction of mechanism by which the said shaft is caused to actuate the two shafts J and K, which, as before remarked, are common to all the needle mechanisms, and which are shown in Sheet 3 in connection with one of the needle mechanisms. In Fig. 12 the shaft K only is shown, the other shaft, J, being directly below it. In Figs. 13 and 14, however, is shown the relation of the shafts J and K to each other, and the wheels V V', by which the two shafts are geared together, for the shaft J of the needle mechanisms must rotate continuously while the machine is in operation, the shaft K, on the other hand, being vibrated, and this vibration is effected by mechanism illustrated in Fig. 14. A crank-pin on the wheel V is connected by a rod, $x^2$, to a rocking arm, $V^2$, pivoted to the frame of the machine, and this arm is connected by a rod, $V^3$, to an arm, $V^4$, on the shaft K; hence it will be seen that while the shaft J, appertaining to the needle mechanisms, rotates continuously the shaft K, appertaining to the same mechanisms, is vibrated.

Figure 15:
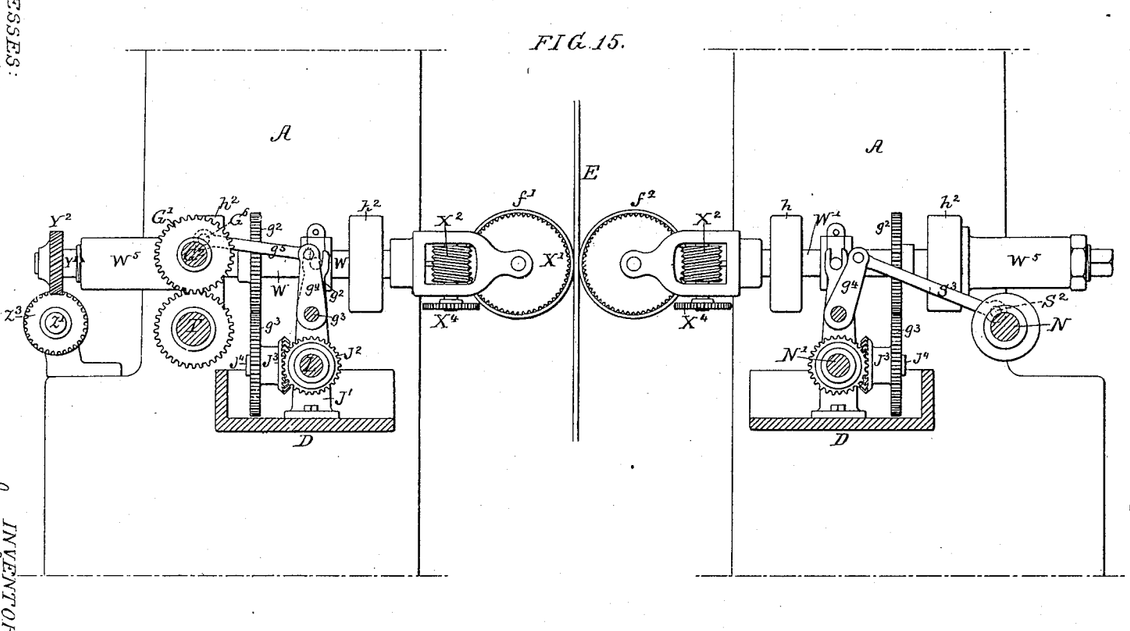
Fig. 15, Sheet 6, a transverse section of the machine, showing the pantograph mechanism.

*Pantograph mechanisms.*—Referring, in the first place, to Fig. 1, it has been remarked that the embroidering-frame D' is provided with two pantograph-plates, E E', one at each end of the frame; there are consequently two pantograph mechanisms carried by the frame of the machine, and operating in unison with each other, and each pantograph mechanism is composed of two parts, (shown in their proper relation to each other in Fig. 15, Sheet 6,) one part carrying one pantograph-wheel, $f'$, the other carrying the opposite pantograph-wheel, $f^2$, and one of the pantograph-plates, E, of the embroidering-frame being between the two wheels. Both of these wheels are arranged to revolve intermittently simultaneously and in unison with each other on their axes, and are also arranged to be turned laterally simultaneously and in unison with each other, and with the two shafts W W', which are in line with each other, one shaft appertaining to one part and the other shaft to the other part of the pantograph mechanism. The movement of the embroidering-frame is due to the rotation of the two wheels $f'$ and $f^2$, which act on the pantograph-plate E, and the direction in which the embroidering-frame moves will depend upon the plane in which the wheels revolve, and the wheels can be adjusted to intermittently revolve in any desired plane by turning the shafts W W'.

Figures 16, 17, 18, 19:
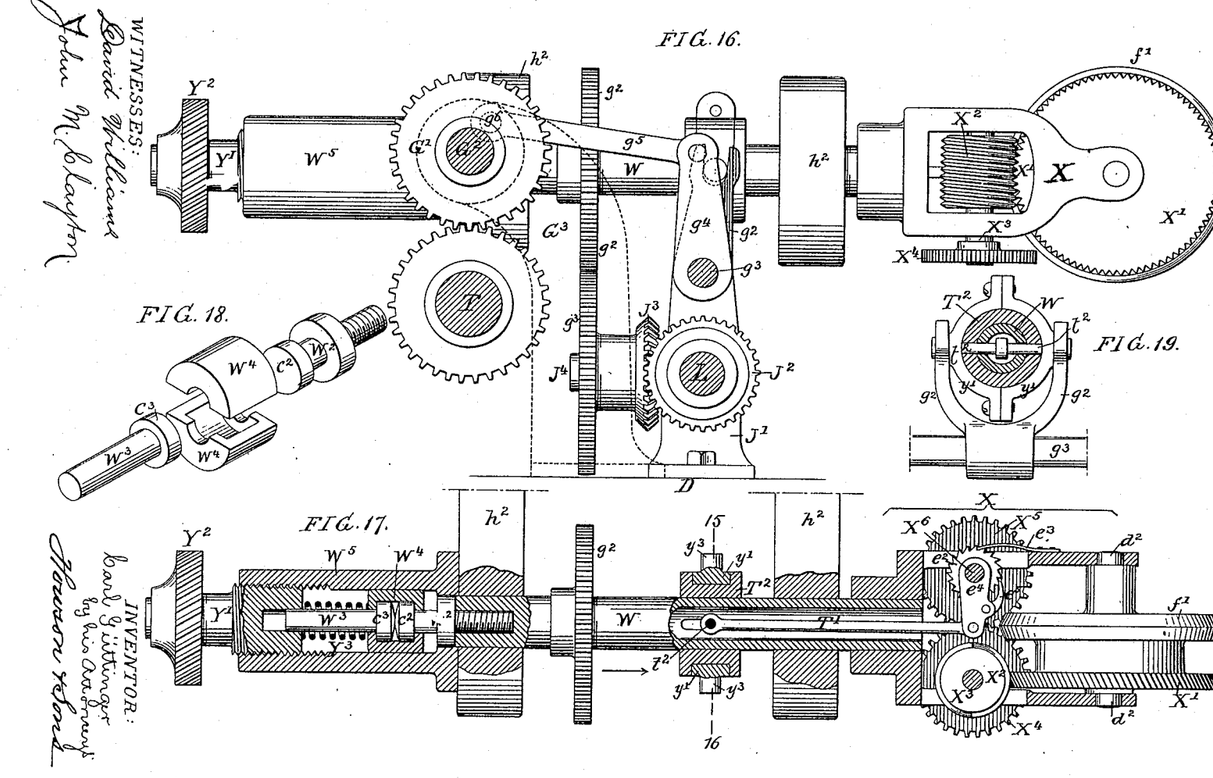
Fig. 16, Sheet 7, a view of part of the pantograph mechanism, drawn to a larger scale.
Fig. 17, a sectional plan of Fig. 16.
Fig. 18, a detached perspective views of parts of Figs. 16 and 17.
Fig. 19, a transverse section on the line 15 16, Fig. 17.

As both parts of each embroidering mechanism are nearly alike, I will proceed to describe that part illustrated in detail by Figs. 16, 17, 18, and 19, Sheet 7. The shaft W, above referred to as carrying the pantograph-wheel $f'$, is adapted to bearings $h^2\ h^2$, secured to one of the end standards of the main frame of the machine. A shaft, L, which has been referred to in connection with Figs. 3 and 4, Sheet 3, has its bearings in a stand, J', secured to the extension D of the main frame of the machine, and a bevel-wheel, $J^2$, on this shaft gears into a bevel-wheel, $J^3$, on a fixed stud, $J^4$, a cog-wheel, $g^3$, on the hub of the wheel $J^3$, gearing into a cog-wheel, $g^2$, on the shaft W, into the end of which is screwed a stud, $W^2$, having a rounded end, $c^2$, against which bears the rounded head $c^3$ of a pin, $W^3$, both heads being contained in a two-part cylindrical block, $W^4$, which is arranged to slide in a sleeve, $W^5$, secured to the bearing $h^2$. A plug, Y', screws into the end of the fixed sleeve $W^5$, this plug having a worm-wheel, $Y^2$, which will be referred to hereinafter. On screwing the plug into the end of the sleeve the sliding block $W^4$, and consequently the shaft W, will be moved in the direction of the arrow, (Fig. 17,) and the pantograph-wheel $f'$ will be forced against the pantograph-plate with a yielding-pressure, however, as a spiral spring, $Y^3$, is interposed between the end of the plug Y' and the sliding block $W^4$. The journals $d^2$ of the pantograph-wheel $f'$ have their bearings in a carrier, X, secured to the shaft W, and on a hub of the said pantograph-wheel is a worm-wheel, X', into which gears a worm, $X^2$, on a spindle, $X^3$, which has its bearings in the carrier X, and which has a cog-wheel, $X^4$, gearing into a similar wheel, $X^5$, on a shaft, $X^6$, which also has its bearings in the carrier, and to which is secured a ratchet-wheel, $e^2$, which is prevented from turning, excepting in one direction, by a spring-catch, $e^3$, an arm, $e^4$, loose on the spindle $X^6$, having a spring-pawl, $e^5$, the point of which is adapted to the teeth of the ratchet-wheel $e^2$. The arm $e^4$ is connected by a rod, T', in the interior of the shaft W, to a sleeve, T², which is arranged to slide on the said shaft, the connecting-pin $t^2$ passing through slots in the shaft and projecting into the sleeve, as shown in Fig. 19. A two-part ring, $y'$, is adapted to a groove in the sleeve T², and pins $y^3$ on the ring are adapted to slots in the upper forked end of the arm $g^2$ on a shaft, $g^3$, which has its bearing in the stand J', and to which is secured an arm, $g^4$, connected by a rod, $g^5$, to a crank-pin, $g^6$, on a cog-wheel, G', which is loose on a stud, G², on a bracket, G³, (shown by dotted lines in Fig. 16, and also shown in Fig. 12,) and is geared to a similar wheel on the shaft T. This shaft T is a power-driven shaft and the shaft L is controlled by hand, the location of these shafts on the machine being explained hereinafter. The rotating shaft T will impart an intermittent motion to the pantograph-wheel $f'$ through the medium of the devices which have been too fully described to need enumeration, and by moving the shaft L by hand the shaft W, and with it the carrier X and pantograph-wheel $f'$, will be turned.

Referring back to Fig. 15, Sheet 6, it will be seen that the mechanism last described for operating the pantograph-wheel $f'$, and illustrated on Sheet 7, occupies a position on the left of Fig. 15, the mechanism on the right of the figure for operating the opposing pantograph-wheel $f^2$ being similar to that on the left, with this exception, that the arm $g^4$ is vibrated directly from the shaft N by a crank-pin, S², and rod S³.

Figure 20:
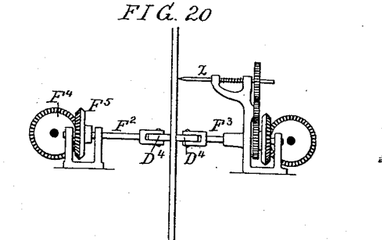
Fig. 20, Sheet 5, a view of the pointer and gearing connected to the pantograph mechanism.

It will now be necessary to refer to Sheet 5 in order to describe the gearing by which the hand-moved portions of the two parts of the pantograph devices are operated simultaneously and in unison. The dotted lines $i^2$ and $i^3$, Fig. 12, indicate the centers of the shafts W W' of the two parts of the pantograph mechanism shown in Fig. 15, one shaft carrying the pantograph-wheel $f'$ and the other shaft the pantograph-wheel $f^2$, between which is the metal pantograph-plate E of the embroidering-frame. A shaft, B², having its bearings in the extension D of the frame, is provided with an operating-handle, B³, and is geared by miter-wheels $f^3$ and $f^4$ to the shaft L, and by similar wheels, $f^5$ and $f^6$, to the shaft N', these being the shafts by which the shafts W W', Fig. 15, carrying the pantograph-wheels, are turned on their axes through the medium of the mechanism described above. Two spindles, F² and F³, have their bearings in attachments to the frame of the machine, the spindle F² being geared by miter-wheels F⁴ and F⁵ to the shaft N', and the spindle F³, by similar miter-wheels, F⁶ and F⁷, to the shaft L, Fig. 12. Each of these spindles carries a wheel, D⁴, one wheel on one side and the other on the opposite side of the pattern-board G of the embroidering-frame, the sole object of these wheels being to steady the frame. The shafts, however, which carry the wheels operate in unison with the shafts W W', carrying the pantograph-wheels, so that the latter shall always revolve in a plane parallel with that in which the said wheels D⁴ turn. The spindle F³ is geared to the pointer-spindle $z$, as shown in Fig. 20, and it is to the point of this spindle and to the pattern on the board G that the operator directs his attention in manipulating the handle B³, by which the repetition of the pattern on the fabric on the embroidering-frame by the different embroidering mechanisms is assured.

The pantograph mechanism which operates in connection with the pantograph-plate E' at the outer end of the embroidering-frame is precisely similar to that above described, excepting that there is no pattern-board G and no pointer at the opposite end of the said frame, the action of the pantograph-wheels, in connection with the plate E', simultaneously and in unison with that of the pantograph-wheels $f' f^2$, in connection with the pantograph-plate E, being assured by extending the shafts N' and L and gearing them to the pantograph mechanism, operating in connection with the said plate E', precisely in the manner described above.

Figure 21:
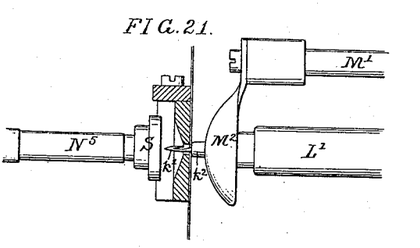
Fig. 21, Sheet 5, a view illustrating the relation of the needle and looper to each other.

*Co-operation of the pantograph mechanism with the embroidering mechanism.*—Referring to Fig. 21, which shows the looper S on the end of the looper-spindle N⁵ and the hooked needle, it is essential that the needle should turn in unison with the pantograph devices which feed the embroidering-frame, so that the hook of the needle may not present itself in direct opposition to the direction in which the fabric is fed, and it is also essential that the looper shall turn in unison with the needle. This turning of the looper and needle is effected by the shaft B², from which also are operated the pantograph devices, the shafts N' and L being, as before seen, geared to this shaft, and the said shafts N' and L being common to all the embroidering mechanisms, and the mechanism through which the looper and needle are turned from these shafts in unison with the pantograph devices has been explained in referring to the views on Sheets 3 and 4.

The action of the pantograph devices on the embroidering-frame is intermittent, and there is no movement of the frame while the needle is entering or being withdrawn from the fabric, the movement of the frame being effected while the needle is clear of the fabric.

The intermittent action of the pantograph mechanism in unison with the embroidering devices is brought about by the proper timing of the devices by which the pantograph-wheel is intermittently rotated and the devices which operate the needles. As above remarked, the pantograph-wheel $f'$ is caused to bear against the pantograph-plate E of the frame by manipulating the wheel Y², Sheet 7; but as there are two pantograph devices—one at each end of the embroidering-frame—it is essential that both should be simultaneously brought to bear against their respective plates, and when necessary simultaneously retracted from the said plates, so as to release the same from the control of the pantograph-wheels. This simultaneous action of the two pantograph-wheels is brought about by a shaft, Z', Figs. 1 and 15, which is geared at one end by a wheel, $z^3$, to the wheel $Y^2$ of one pantograph device, and by a similar wheel to the wheel $Y^2$ of the other pantograph device, the shaft Z', which has its bearings in brackets secured to the main frame of the machine, being provided with a suitable handle, $z^2$, Fig. 1, within easy reach of the operator of the pantograph device.

Figures 22, 23, 28, 29, 30:
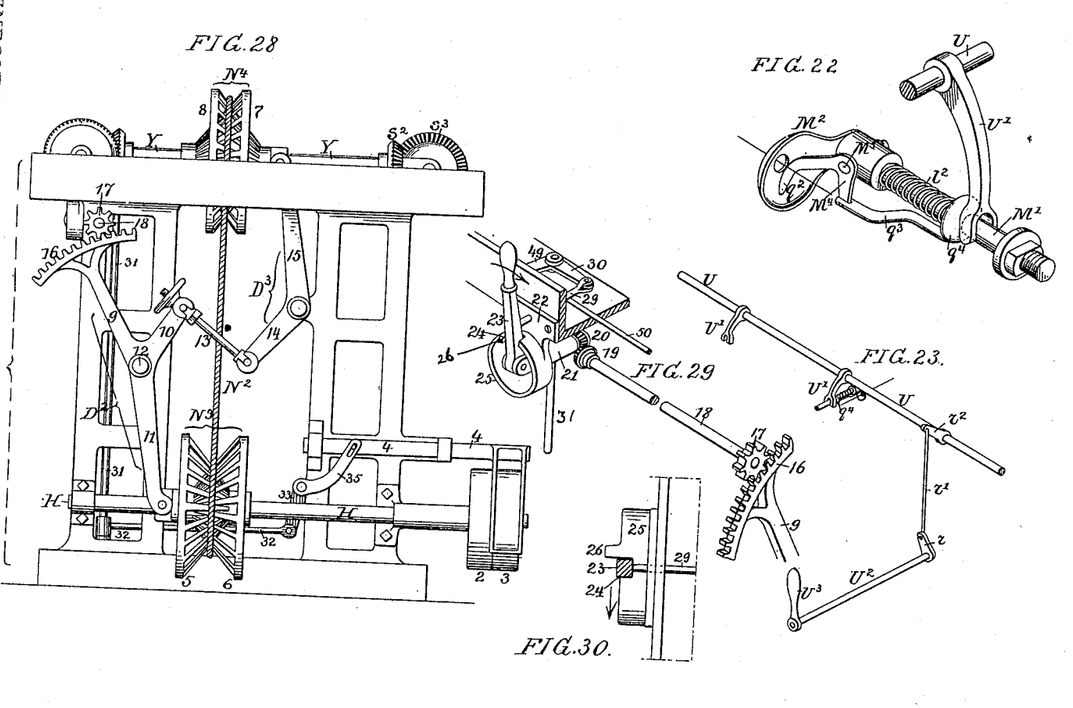
Figs. 22 and 23, Sheet 8, perspective views of the devices for cutting off the threads.
Fig. 28, Sheet 8, a view of that end of the machine where the driving mechanism is situated.
Fig. 29, a perspective view of part of the starting and stopping mechanism.
Fig. 30, a view of a part of the said mechanism.

*Cutting-off device.*—This device is illustrated in Fig. 3, Sheet 3, Fig. 21, Sheet 5, Figs. 22 and 23, Sheet 8, the operating-handle only being shown in Figs. 1 and 23. Referring to Fig. 3, it will be seen that a rod, M', previously referred to, is secured to the tubular shaft $L^2$ of the needle mechanism. To the outer end of this rod is secured a concavo-convex shield, $M^2$, through an orifice in the center of which passes the nipple $k^2$ on the tube L', and through the nipple passes the needle, the thread seized by the needle being drawn through the orifice of the shield when the nipple is retracted. The pin $M^5$ of a lever, $M^4$, is pivoted to the rod M', one arm of this lever consisting of a knife, $q^2$, Fig. 22, adapted to the concave inner side of the shield, and the other arm being connected by a rod, $q^3$, to a collar $q^4$, which is arranged to slide on the rod M', a spring, $l^2$, tending to keep the knife $q^2$ away from the orifice in the shield and from the course of the thread. After the nipple and needle have been retracted the thread may be instantly severed by sliding the collar $q^4$ forward toward the shield, the knife, after performing this duty, being restored by the spring $l^2$ to its former position on releasing the collar $q^4$.

In order that the threads of all the embroidering mechanisms may be simultaneously severed, a shaft, U, (shown in the perspective view, Fig. 23,) extends along the frame of the machine, and this shaft has as many arms U' as there are embroidering devices, each arm being arranged to bear against the collar $q^4$ of each rod M'. A shaft, $U^2$, having its bearings in the frame of the machine and provided with a handle, $U^3$, the location of which is shown in Fig. 1, has an arm, $r$, connected by a rod, $r'$, to an arm, $r^2$, Fig. 23, so that by manipulating the handle all the threads of all the embroidering devices may be simultaneously severed. It should be understood, however, that this is done after the machine has been stopped and the needle retracted, the severing being required either after a series of embroidered patterns have been completed or when it is necessary to discontinue the embroidering at any specific part of the pattern and to recommence the same at a distant part of the said pattern.

Figures 24, 25, 26, 27:
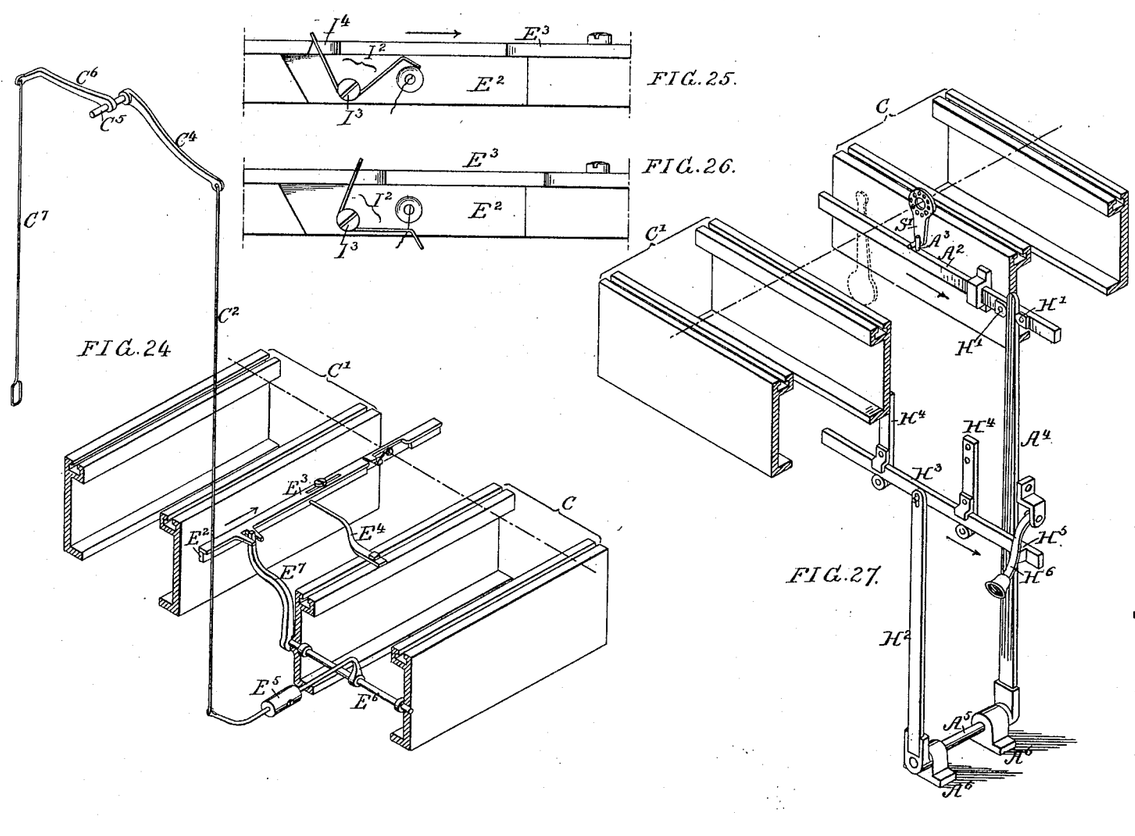
Fig. 24, Sheet 9, a perspective view illustrating the mechanism connected with the devices, for retaining the threads while they are being cut off.
Figs. 25 and 26, views drawn to a larger scale, and illustrating the thread-retainers.
Fig. 27, part of the signaling device for notifying the attendant when the thread breaks.

*Mechanism for retaining the threads while being cut.*—It is advisable that the threads should be held so as to be under slight tension while they are being cut. The thread-holding device is shown in part in Fig. 7, Sheet 4, and in full in Figs. 24, 25, and 26, Sheet 9. Referring to Fig. 7, it will be seen that there is in front of the looper a bar, $E^2$, through which the rod passes. This bar extends nearly throughout the entire length of the frame of the machine, and is shown in Fig. 24, where are also shown the longitudinal beams C C' of the frame, the dotted line in that figure representing the course of the thread appertaining to one of the spindles of one of the embroidering mechanisms. The bar $E^2$, which is fixed to the frame, being supported at intervals by arms $E^4$, carries a bar, $E^3$, which is confined to the said bar $E^2$, but is arranged to slide longitudinally thereon. The bar $E^3$ may be moved in the direction of the arrow, Fig. 24, by raising a weighted lever, $E^5$, secured to a shaft, $E^6$, which has its bearings in the frame of the machine, and to which is secured an arm, $E^7$, extending upward and between projections on the bar $E^3$. On releasing the weighted lever $E^5$ the sliding bar $E^3$ will move back to its former position. I prefer for raising the weighted lever $E^5$ a rod, $C^2$, attached at its lower end to the bar and at its upper end to an arm, $C^4$, attached to a small shaft, $C^5$, having its bearings in the upper portion of the frame, and provided with an arm, $C^6$, from which is suspended a rod or cord, $C^7$, terminating in a suitable handle within reach of the attendant.

Turning to Figs. 25 and 26, which are enlarged views of the bars $E^2$ $E^3$ and their attachments, a small bell-crank lever, $I^2$, is pivoted by a pin, $I^3$, to the bar $E^2$ within a recess in the same, one arm of the lever passing through a notch, $I^4$, in the bar $E^3$, and the bent end of the other arm being above the orifice through which the thread passes. When the bar $E^3$ is moved in the direction of the arrow, Fig. 25, by the appliances described above, the bent arm of the lever will be depressed, and will hold the thread against the bar $E^2$, as shown in Fig. 26, until the weighted lever $E^5$ is released, when the lever $I^2$ will be restored to its former position and the thread will be at liberty. There is one of these holding-levers for each of the embroidering mechanisms, so that when all the threads have to be severed the attendant must pull the rod $C^7$ with one hand, thereby holding all the threads, and then manipulate the handle $U^3$, thereby severing all the threads.

*Signaling device for indicating the breaking of one or more threads.*—It has been stated, in referring to Figs. 7, 8, and 9, Sheet 4, "that if a thread breaks during the movement of the tubular shaft in its bearings, the sliding rod $w'$ will be released, and the spring $v'$, acting on the rod through the medium of the arm $v$, will force the said rod in the direction of the arrow, and will enter one of the orifices of the arm S' and move the same, causing it to strike any signaling device which may notify the attendant." Fig. 27 shows the signaling device which I prefer to use. A rod, $A^2$, extends nearly throughout the entire length of the frame, and is arranged to slide in guides on one of the longitudinal beams. This rod has a series of pins, A³, one for each of the embroidery mechanisms, each pin being so situated as to be struck by one of the arms S', above referred to. An arm, A⁴, on a shaft, A⁵, adapted to bearings A⁶, secured to the floor, extends between two projections, H', on the sliding bar A², and an arm, H², on the same shaft, is connected to a bar, H³, which is carried by brackets H⁴, secured to the frame of the machine, and is arranged to slide freely on guides on the said brackets, this bar H³ having a projection, H⁵, which, when moved in the direction of the arrow, will release an elastic arm, H⁶, carrying a bell, and pivoted to an attachment on the arm A⁴, so that there will be a ringing of the bell whenever the rod A² is moved in the direction of its arrow, and this will be the case whenever any one or more of the threads break.

In order to enable others to construct and operate the machine, it has been deemed best to introduce complete illustrations and descriptions of the starting and stopping mechanism. This mechanism is illustrated in part in Fig. 1, Sheet 1, and more fully by Figs. 28, 29, and 30, Sheet 8, and by the skeleton perspective view, Fig. 31, Sheet 10.

Referring to Fig. 28, it will be seen that the driving-shaft H is furnished with a fast pulley, 2, and a loose pulley, 3, in connection with which is a belt-shifting bar, 4, adapted to guides on the extension D of the frame-work of the machine. A driving-rope, N², passes round a driving-pulley, N³, and round a pulley, N⁴, on the counter-shaft Y, from which the several embroidering mechanisms derive their movements through the medium of the gearing described above. The pulley N³ is composed of two parts, 5 and 6, the former movable and the latter fixed to the shaft H, each part having inclined arms, which pass through the spaces between the inclined arms of the other part. By moving the part 5 away from the part 6 the effective diameter of the pulley will be decreased, and the nearer the part 5 is adjusted to the part 6 the greater will be the effective diameter. The pulley N⁴ on the counter-shaft Y is precisely similar, the part 7 of this pulley being adjustable and the part 8 fixed on the shaft. Hereinafter I shall designate these pulleys as "expansible" and "contractible" pulleys. A lever, D², pivoted to a stud, 12, on the frame of the machine, has three arms, 9, 10, and 11, the latter being connected to a collar on the hub of the loose portion 5 of the pulley N³, and the arm 10 of the lever by a rod, 13, to the short arm 14 of a lever, D³, which is also pivoted to the frame, and the long arm 15 of which is connected to a collar on the hub of the movable portion 7 of the pulley N⁴ on the counter-shaft Y. The arm 9 of the lever D² has a toothed segment, 16, into which gears the pinion 17 on the shaft 18, which has its bearings in the frame of the machine, and which is geared by bevel-wheels 19 and 20, Fig. 29, to a shaft, 21, which has its bearing in a bracket, 22, secured to the frame. To the end of the shaft 21 is pivoted a hand-lever, 23, which can fit into a notch, 24, in the circular flange 25, forming part of the bracket 22, on the edge of which flange there is also a projection, 26. (Shown in Fig. 30.) It will be necessary here to refer to Fig. 12, noting, in the first instance, a flanged disk, 27, secured to the shaft N, the stoppage of which must result in the stoppage of the entire power-driven operating parts of the machine. It is important that when the machine is stopped all these parts should be in a given position, all the needles being retracted. The flanged disk 27 has a recess inclined on one side and abrupt on the other, and when the motion of the machine has to be arrested a stop, 28, enters the recess of the flange, and the abrupt end of the recess coming in contact with it, there can be no further rotation of the shaft; but this stop must operate in connection with the belt-shifting device, and this it does through the medium of mechanism which can be best described in connection with Figs. 29 and 31. When the hand-lever 23 is in the notch of the disk 25, it is in contact with, but has not been forced hard against the end of a short guided rod, 29, connected to an arm, 30, on a vertical shaft, 31, which has its bearings in attachments to the frame of the machine, and on which is another arm connected by a rod, 32, to an arm, 33, on a shaft, 34, which also has its bearings in the frame-work of the machine, and which has an arm, 35, connected to the belt-shifting rod 4. A vertical rod, 38, possessing slight elasticity, is secured at its lower end to an attachment on the frame, and terminates at the top in a head, 39. The above-mentioned stop 28 bears on this head 39, not permanently, however, for the stop has a pin, 40, passing through the head 39, and a spiral spring coiled round the pin intervenes between a head on the pin and the under side of the head 39, so that when the abrupt termination of the notch in the flange of the disk 27, as the latter revolves in the direction of the arrow, strikes the stop the latter will yield to a limited extent, and thus diminish the shock. A small pin, 41, projecting from the head 39 through a slot in the stop, maintains the latter in its proper lateral position on the said head. A treadle-lever, K², pivoted to an attachment on the floor, is connected by a rod, 42, to an arm, 43, of the three-armed lever R², which is pivoted to a bracket, 46, Fig. 12, on the frame of the machine. The arm 45 of the lever is connected by the rod 47 to the elastic rod 38, a spring, 48, tending to force the rod in the direction of the arrow. An arm, 49, on the vertical shaft 31, is connected to a rod, 50, which is arranged to slide in suitable guides, 51, on the frame of the machine, and the arm 44 of the three-armed lever R² is caused to bear on the top of this rod, near the end of the same, the rod being provided with an enlargement, 52. There is a hand-lever, 53, on the vertical shaft 31.

Figure 31:
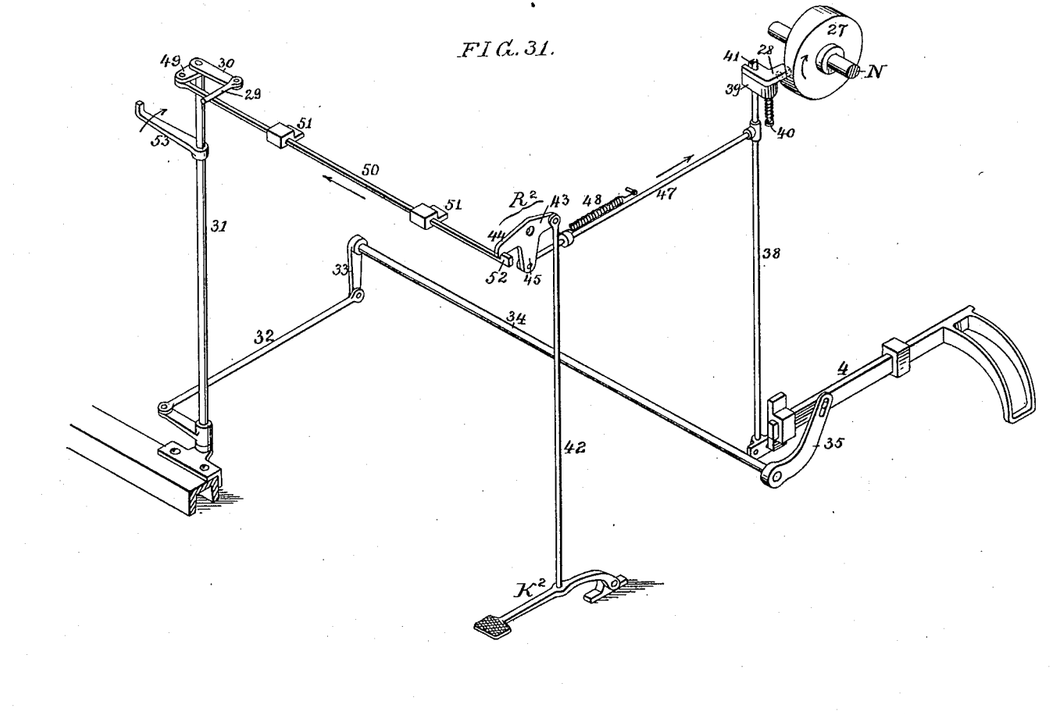
Fig. 31, Sheet 10, a skeleton perspective view of the operating parts of the starting and stopping mechanism.

When the several parts above described are in the positions shown in Figs. 28, 29, and 31, the machine is stopped.

In order to start the machine the attendant depresses the treadle lever K² and pushes the hand-lever 53 in the direction of its arrow. By these operations the stop 28 is withdrawn from the disk 27 and the shaft N is at liberty to be rotated. At the same time the shifting-bar is so operated as to move the driving-belt from the loose pulley 3 to the fast pulley 2, and the sliding bar 50 has been moved to a position where its enlargement is beneath the arm 44 of the three-armed lever R², and this prevents the return of the stop 28 after the treadle has been released. The counter shaft is now rotating, but at a less speed than the driving-shaft, as the effective diameter of the pulley N⁴ is greater than that of the pulley N³, and it is important that the machine should operate slowly when first started, the speed being subsequently increased. In order to do this, the attendant seizes the hand-lever 23 and turns it with the shaft 21, to which it is attached, in the direction of the arrow until it is arrested by the projection 26 on the edge of the flange 25. By this movement the lever D² is so operated that the loose part 5 of the pulley N³ will be moved nearer to the fixed part, and the effective diameter of the pulley will be increased, that of the pulley N⁴ being correspondingly decreased, and the speed of the machine being consequently increased.

It may be necessary from time to time while the machine is in operation to decrease the speed to some extent—as, for instance, when complex parts of patterns are being embroidered. In order to do this, all that is necessary is for the attendant to turn the hand-lever back to an extent which the desired reduction in speed may suggest.

In order to stop the machine, the first thing to be done is to turn back the hand-lever 23 until it can be again introduced into the notch 24 of the flange 25, as shown in Fig. 29, a movement which results in the reduction of the speed of the machine, owing to the alteration of the pulleys N³ and N⁴, due to this movement of the hand-lever 23, for it is as important for the speed to be lowered before stopping as it is to start the machine at a low speed. The hand-lever 23 being now in the notch of the flange, it is pushed forcibly back into the same and against the end of the guided rod 29, thereby turning the shaft 31 to such an extent that the shifting-bar will move the belt from the fast to the loose pulley. At the same time the three armed lever R² will be relieved from the control of the enlargement 52 on the rod 50, and the spring 48 will then be at liberty to force the rod 47 in the direction of the arrow and the stop 28 to such a position that it will arrest the wheel 27, and consequently the shaft N, at the point desired.

I claim as my invention—

1. The combination, in an embroidering-machine, of the following elements: first, an embroidery-frame, and mechanism for imparting an intermittent movement to the said frame; second, a bar, E², between the looper and the fabric; third, the nipple $k^2$ on the opposite side of the fabric, and the needle $k'$, passing through the nipple; and, fourth, mechanism, substantially as described, whereby the nipple $k^2$ is caused to confine the fabric to the bar E² while the needle is passing through and out of the fabric, and whereby the needle is caused to retreat from the fabric during the intermittent movement of the same, as set forth.

2. The combination of the tube L', carrying the nipple, the tubular shaft L², bearings adapted thereto, mechanism whereby the said tube L' can be intermittently reciprocated and rotated in said shaft L², with the needle-carrying bar $k$, and with mechanism whereby the needle-bar can be reciprocated independently of the tube, but can be rotated with the said tubular shaft and tube, substantially as described.

3. The combination of the needle-bar $k$, the slotted tubular rod $j^2$, the slotted tube L', the tubular shaft L², and the key $n$, all constructed substantially as specified.

4. The combination of the rotated shaft J, tube L', carrying the nipple, and the reciprocated needle-bar with the hand-controlled shaft L and connecting mechanism, by which a vibrating motion may be imparted from the shaft L to the said tube L' and the needle-bar simultaneously, and with mechanism by which the tube L' is reciprocated from the said shaft J, all substantially as set forth.

5. The combination of the arm $j$, the tube $j^2$, a sleeve, $j'$, connected to said arm, and the needle-bar $k$, attached to and removable from the tube, all constructed substantially as set forth.

6. The combination, in an embroidering-machine, of an embroidery-frame, and a pantograph-plate attached thereto, and two pantograph-wheels, $f' f^2$, one on one side and the other on the opposite side of said plate, with the two shafts N and T geared together, mechanism for rotating the said pantograph-wheels simultaneously from the said shafts, the two hand-operated shafts L and N', and mechanism whereby the wheels may be turned laterally simultaneously from the said shafts, all substantially as set forth.

7. The combination, in an embroidering-machine, of the shaft W, carrying a pantograph-wheel, and adapted to turn and slide in suitable bearings, with a sleeve, W⁵, attached to one of the bearings, the screw-plug Y', and devices by which an endwise-yielding pressure may be imparted by the said screw-plug to the shaft W, to force the pantograph-wheel against the pantograph-plate, substantially as specified.

8. The combination, with the embroidery-frame of an embroidering-machine, of the shaft W, fixed sleeve W⁵, screw-plug Y', the stud W², attached to the shaft, and having a head, $c^2$, a pin, W³, having a head, $c^3$, the two-part sliding box $W^4$, recessed to contain the said heads $c^2$ $c^3$, and spring $Y^3$, interposed between the said box and screw-plug, all substantially as set forth.

9. The combination, with the embroidery-frame of an embroidering-machine, of the tubular shaft W, the carrier X, attached thereto, the pantograph-wheel having journals bearing in the said carrier, the shaft $X^6$, geared to the said pantograph-wheel, and having a ratchet-wheel, $e^3$, with an arm, $e^4$, provided with a spring-pawl and connected to the reciprocated sleeve $T^2$ on the shaft W by a rod, T', contained partly within the said shaft by a pin, $t^2$, passing through slots in the shaft, all substantially as specified.

10. The combination of the tubular shaft $L^2$ of the needle mechanism of the embroidering-machine with a shield, $M^2$, and knife $q^2$, and mechanism for operating the knife, substantially as set forth.

11. The combination of the shaft $N^5$ of the looping mechanism of an embroidering-machine, the looper S, carried by the shaft, the bar in front of the same, the thread-retainer attached to the bar, and under the control of the attendant, with the shaft L' of the needle mechanism, and the shield $M^2$, carried by the shaft, and a knife, $q^2$, also under the control of the attendant, substantially as described.

12. The combination of the tubular shaft $L^2$ of the needle mechanism of the embroidering-machine, the rod M', carried by the said shaft, the shield $M^2$, secured to the rod M', the lever $M^4$, pivoted thereto, one arm of this lever being a knife, $q^2$, a sliding collar, $q^4$, and a spring, $l^2$, all substantially as set forth.

13. The combination of a series of tubular shafts, $L^2$, of the needle mechanism of a series of embroidering devices in an embroidery-machine, a thread-cutting device carried by each tubular shaft, a shaft, U, and mechanism by which it may be operated, a series of arms, U', on the said shaft, and mechanism, substantially as described, by which each arm is caused to operate the thread-cutter, all substantially as set forth.

14. The combination of the looper S of the looping mechanisms of a series of embroidering-machines, a movable bar, $E^3$, and a fixed bar, $E^2$, having a number of orifices, one for the passage of the thread of each embroidering-machine, a series of thread-retainers controlled by the said bar $E^3$, and mechanism whereby the latter is placed under the control of the attendant, all substantially as set forth.

15. The combination of the series of shafts $L^3$ of the looping mechanisms of a series of embroidering-machines, an arm, S', on each shaft, and devices, substantially as described, for locking and releasing said arm in obedience to the condition of the thread, with the sliding bar $A^2$, common to all the series of embroidering mechanisms, and constructed to be operated by any one or more of the said arms S', and with a bell or other signaling device, to be operated by the movement of any one or more of the arms, all substantially as described.

In testimony whereof I have signed my name to this specification in the presence of two subscribing witnesses.

CARL GÜTTINGER.

Witnesses:
JOHN M. CLAYTON,
HARRY SMITH.